(12) United States Patent
Xie (10) Patent No.: US 11,708,906 B2
(45) Date of Patent: Jul. 25, 2023

(54) AUTOMATIC TRANSMISSION PARK CONTROL SYSTEM

(71) Applicant: Zhe Xie, Rochester, MI (US)

(72) Inventor: Zhe Xie, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 226 days.

(21) Appl. No.: 17/122,108

(22) Filed: Dec. 15, 2020

(65) Prior Publication Data

US 2021/0190205 A1 Jun. 24, 2021

Related U.S. Application Data (60) Provisional application No. 62/950,618, filed on Dec. 19, 2019.

(51) Int. Cl.
*F16H 63/34* (2006.01)
*F16H 63/48* (2006.01)

(52) U.S. Cl.
CPC ....... *F16H 63/3483* (2013.01); *F16H 63/483* (2013.01)

(58) Field of Classification Search
CPC ............... F16H 63/3483; F16H 63/483; F16H 61/0251; F15B 2211/30505; F15B 2211/426; F15B 2211/862; F15B 2211/875; F15B 11/16; F15B 20/002
See application file for complete search history.

(56) References Cited

U.S. PATENT DOCUMENTS

| 4,326,433 | A | * | 4/1982 | Black | F16H 61/0276 475/135 |
|---|---|---|---|---|---|
| 5,378,207 | A | | 1/1995 | Stevenson | |
| 6,840,885 | B2 | | 1/2005 | Yi et al. | |
| 7,575,111 | B2 | | 8/2009 | Ogata et al. | |
| 7,862,471 | B2 | | 1/2011 | Koski et al. | |
| 8,649,951 | B2 | | 2/2014 | Funakoshi et al. | |
| 10,408,347 | B2 | | 9/2019 | Gittins et al. | |
| 2019/0309847 | A1 | * | 10/2019 | Merklein | F16H 63/3483 |
| 2020/0149631 | A1 | * | 5/2020 | Tachibanada | B60T 1/005 |

* cited by examiner

*Primary Examiner* — Lori Wu
(74) *Attorney, Agent, or Firm* — Ralph E. Smith (57) ABSTRACT

An electro-hydraulic park control system includes a park piston and a park control valve disposed in a valve body of a transmission of a vehicle and configured to control a supply of hydraulic fluid pressure to control the park piston and to operate such that (i) no single element failure of the transmission will cause the transmission to shift from a park state to a non-park state or (ii) to shift from a drive, reverse, or neutral state to the park state, (iii) the transmission is able to remain in the non-park state and remain in or transition to the neutral state when a controller of the transmission is malfunctioning while the transmission is operating in the drive, reverse, and neutral states, and (iv) the transmission is able to quickly transition to the park state while an engine/motor driven pump of the transmission is off or not running.

17 Claims, 9 Drawing Sheets

AUTOMATIC TRANSMISSION PARK CONTROL SYSTEM

CROSS-REFERENCE TO RELATED APPLICATION(S)

The present application claims the benefit of U.S. Provisional Application No. 62/950,618, filed on Dec. 19, 2019. The disclosure of this application is incorporated herein by reference in its entirety.

FIELD

The present application generally relates to hydraulically-actuated vehicle automatic transmissions and, more particularly, to an electro-hydraulic park control system including a park control valve for such vehicle automatic transmissions.

BACKGROUND

A hydraulically-actuated automatic transmission includes a plurality of clutch or band elements that are selectively actuated in response to hydraulic fluid pressure to selectively engage a desired gear corresponding to a requested state of the transmission (drive, neutral, reverse, park, etc.). A transmission control unit (TCU) controls the transmission and typically comprises a controller and a hydraulic pressure system comprising a plurality of solenoids that are controlled by the controller to regulate the hydraulic fluid pressure within the transmission. Potential malfunctions of the TCU could include, for example only, a controller malfunction or an electrical power loss. During such malfunctions, the transmission could potentially be inadvertently shifted into or out of the park state, which is an undesirable scenario. Accordingly, while such conventional hydraulically-actuated transmission systems do work well for their intended purpose, there remains a desire for improvement in the relevant art.

SUMMARY

According to one example aspect of the invention, an electro-hydraulic park control system for a transmission of a vehicle is presented. In one exemplary implementation, the system comprises a park piston configured to transition between park and non-park positions to control the transmission to park and non-park states, respectively, and a park control valve disposed in a valve body of the transmission and configured to transition between park and non-park positions to control a supply of hydraulic fluid pressure to control the park piston and to operate such that (i) no single element failure of the transmission will cause the transmission to shift from the park state to the non-park state, (ii) no single element failure of the transmission will cause the transmission to shift from a drive, reverse, or neutral state to the park state, (iii) the transmission is able to remain in the non-park state and remain in or transition to the neutral state when a controller of the transmission is malfunctioning while the transmission is operating in the drive, reverse, and neutral states, and (iv) the transmission is able to transition to the park state in less than a period that could result in unintentional vehicle movement while an engine/motor driven pump of the transmission is off or not running, regardless of whether the controller is malfunctioning or not.

In some implementations, the valve body of the transmission further comprises an on/off solenoid configured to supply hydraulic fluid pressure to control the park control valve. In some implementations, during the drive, reverse, and neutral states of the transmission, during normal operation when the controller is not malfunctioning, the on/off solenoid is in an off state and hydraulic fluid pressure is fed to the park piston through the park control valve to keep it in the non-park position, and during default operation when the controller is malfunctioning, hydraulic pressure is maintained by the pump and fed to the park piston through the park control valve to keep it in the non-park state and the transmission defaults to the neutral state.

In some implementations, during the park state of the transmission, during normal operation when the controller is not malfunctioning, the on/off solenoid is turned to an on state to feed hydraulic fluid pressure to the park control valve to transition it to the park state during a non-park to park transmission shift and the on/off solenoid is turned back to the off state thereafter and hydraulic pressure at the park piston is exhausted through a vent port of the park control valve to keep it at the park position, and during default operation when the controller is malfunctioning, the on/off solenoid defaults to the off position, the park control valve and the park piston remain at the park positions, and the transmission remains in the park state.

In some implementations, the system further comprises a diagnostic checkball valve connected between the park control valve and a line pressure supply line connected to the pump. In some implementations, the diagnostic checkball valve comprises a restricted parallel vent path configured to restricted exhaustion of hydraulic pressure in the park piston. In some implementations, the restricted exhaustion of the hydraulic fluid pressure in the park piston provides an opportunity for the park control valve to transition from being stuck in the non-park position after the pump is turned off such and the park piston is still able to move to the park position.

In some implementations, when the pump is off or not running and during normal operation when the controller is not malfunctioning, hydraulic pressure is lost at the park piston and the park control valve causing the transmission to transition to the park state regardless of its previous state. In some implementations, the park control valve is a hydraulic spool valve that controls hydraulic fluid pressure fed to the park piston via three different states including an installed/default state, a fully-actuated/stroked state, and an intermediate/partially actuated state.

According to another example aspect of the invention, a valve body of a transmission of a vehicle, the transmission comprising a park piston configured to transition between park and non-park positions to control the transmission to park and non-park states, respectively, is presented. In one exemplary implementation, the valve body comprises a park control valve configured to transition between park and non-park positions to control a supply of hydraulic fluid pressure to control the park piston, and an on/off solenoid configured to supply hydraulic fluid pressure to control the park control valve, wherein the park control valve is configured to operate such that (i) no single element failure of the transmission will cause the transmission to shift from the park state to the non-park state, (ii) no single element failure of the transmission will cause the transmission to shift from a drive, reverse, or neutral state to the park state, (iii) the transmission is able to remain in the non-park state and remain in or transition to the neutral state when a controller of the transmission is malfunctioning while the transmission is operating in the drive, reverse, and neutral states, and (iv) the transmission is able to transition to the park state in less than a period that could result in unintentional vehicle movement while an engine/motor driven pump of the transmission is off or not running, regardless of whether the controller is malfunctioning or not.

In some implementations, during the drive, reverse, and neutral states of the transmission, during normal operation when the controller is not malfunctioning, the on/off solenoid is in an off state and hydraulic fluid pressure is fed to the park piston through the park control valve to keep it in the non-park position, and during default operation when the controller is malfunctioning, hydraulic pressure is maintained by the pump and fed to the park piston through the park control valve to keep it in the non-park state and the transmission defaults to the neutral state.

In some implementations, during the park state of the transmission, during normal operation when the controller is not malfunctioning, the on/off solenoid is turned to an on state to feed hydraulic fluid pressure to the park control valve to transition it to the park state during a non-park to park transmission shift and the on/off solenoid is turned back to the off state thereafter and hydraulic pressure at the park piston is exhausted through a vent port of the park control valve to keep it at the park position, and during default operation when the controller is malfunctioning, the on/off solenoid defaults to the off position, the park control valve and the park piston remain at the park positions, and the transmission remains in the park state.

In some implementations, the valve body further comprises a diagnostic checkball valve connected between the park control valve and a line pressure supply line connected to the pump. In some implementations, the diagnostic checkball valve comprises a restricted parallel vent path configured to restricted exhaustion of hydraulic pressure in the park piston. In some implementations, the restricted exhaustion of the hydraulic fluid pressure in the park piston provides an opportunity for the park control valve to transition from being stuck in the non-park position after the pump is turned off such and the park piston is still able to move to the park position.

In some implementations, when the pump is off or not running and during normal operation when the controller is not malfunctioning, hydraulic pressure is lost at the park piston and the park control valve causing the transmission to transition to the park state regardless of its previous state. In some implementations, the park control valve is a hydraulic spool valve that controls hydraulic fluid pressure fed to the park piston via three different states including an installed/default state, a fully-actuated/stroked state, and an intermediate/partially actuated state.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

As discussed above, there remains a need for improved hydraulically-actuated automatic transmissions. Specifically, there is a need for such transmissions that are capable of not inadvertently transitioning into or out of the park state during transmission control unit (TCU) malfunctions (e.g., due to an internal fault, also referred to as a controller malfunction, or due to an electrical power loss) and diagnosing a stuck park control valve while requiring minimal additional componentry (solenoids, control valves, etc.) that increase costs, complexity, packaging, and weight. While achieving the above-described goals, the transmission should also be able to meet the following safety objectives during a malfunction of the TCU: (1) no single element failure that will shift the transmission from park to out of park, (2) no single element failure that will shift the transmission from drive, reverse, or neutral to park, (3) the transmission is able to remain out of park and remain in or transition to neutral (a default state) when the TCU is malfunctioning during drive, reverse, and neutral, and (4) the transmission being able to transition to the park state (with no prolonged delay) while an engine/motor driven pump of the transmission is off or not running, regardless of whether the TCU is malfunctioning or not.

Figure 1:
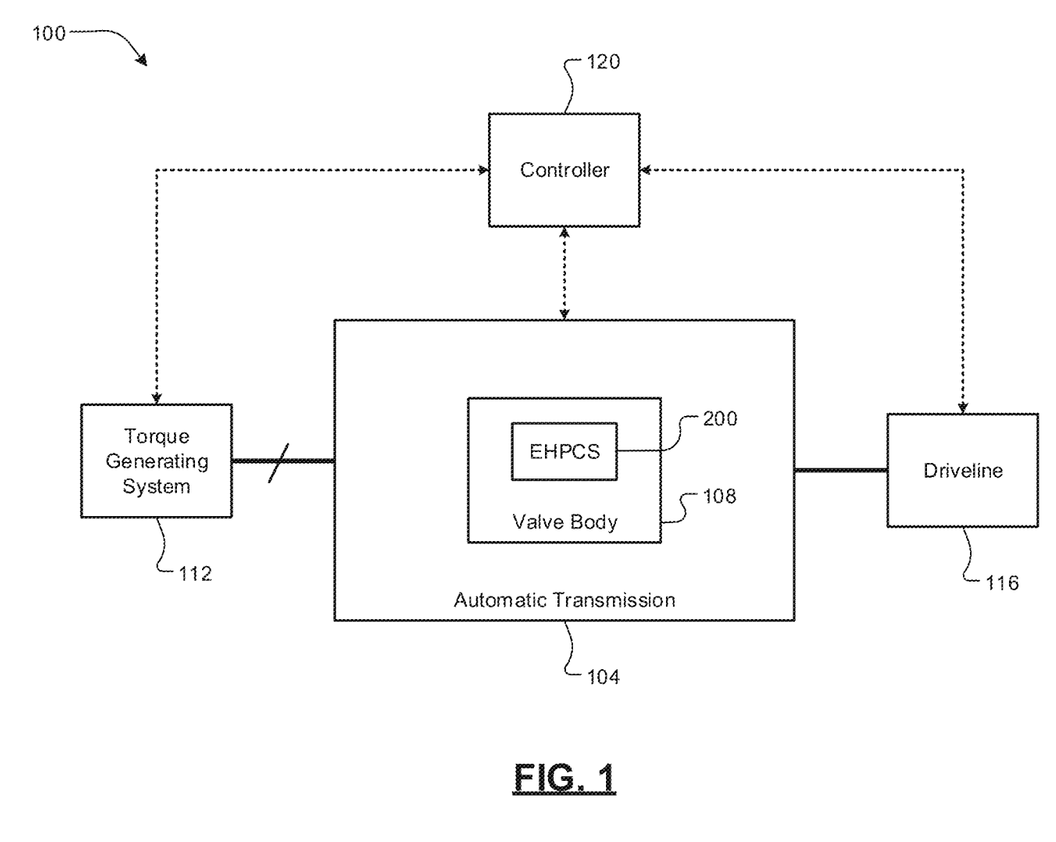
FIG. 1 depicts a functional block diagram of a vehicle having an example transmission including a valve body comprising an electro-hydraulic park control system according to the principles of the present application.

Accordingly, FIG. 1 illustrates a vehicle 100 having a hydraulically-actuated automatic transmission 104 (hereinafter, "transmission 104") including a valve body 108 comprising an electro-hydraulic park control system 200 according to the principles of the present application. In FIG. 1, a functional block diagram of an example configuration of the vehicle 100 is illustrated. The vehicle 100 further comprises a torque generating system 112 (an engine, an electric motor, combinations thereof, etc.) configured to generate drive torque to meet a driver torque request. The drive torque is transferred to a driveline 116 of the vehicle via the transmission 112. The valve body 108 of the transmission 104 operates to control hydraulic fluid pressure therein to selectively actuate one or more clutch or band elements (not shown) to engage a desired gear or gear ratio of the transmission 104 for torque transfer to the driveline 116. A controller 124 controls operation of the vehicle 100, including controlling the torque generating system 112, the transmission 108, and the electro-hydraulic park control system ("EHPCS") 200. While shown as a separate controller 120, it will be appreciated that the controller 120 could be at least partially integrated with the transmission 104 (e.g., a TCU).

Figure 2:
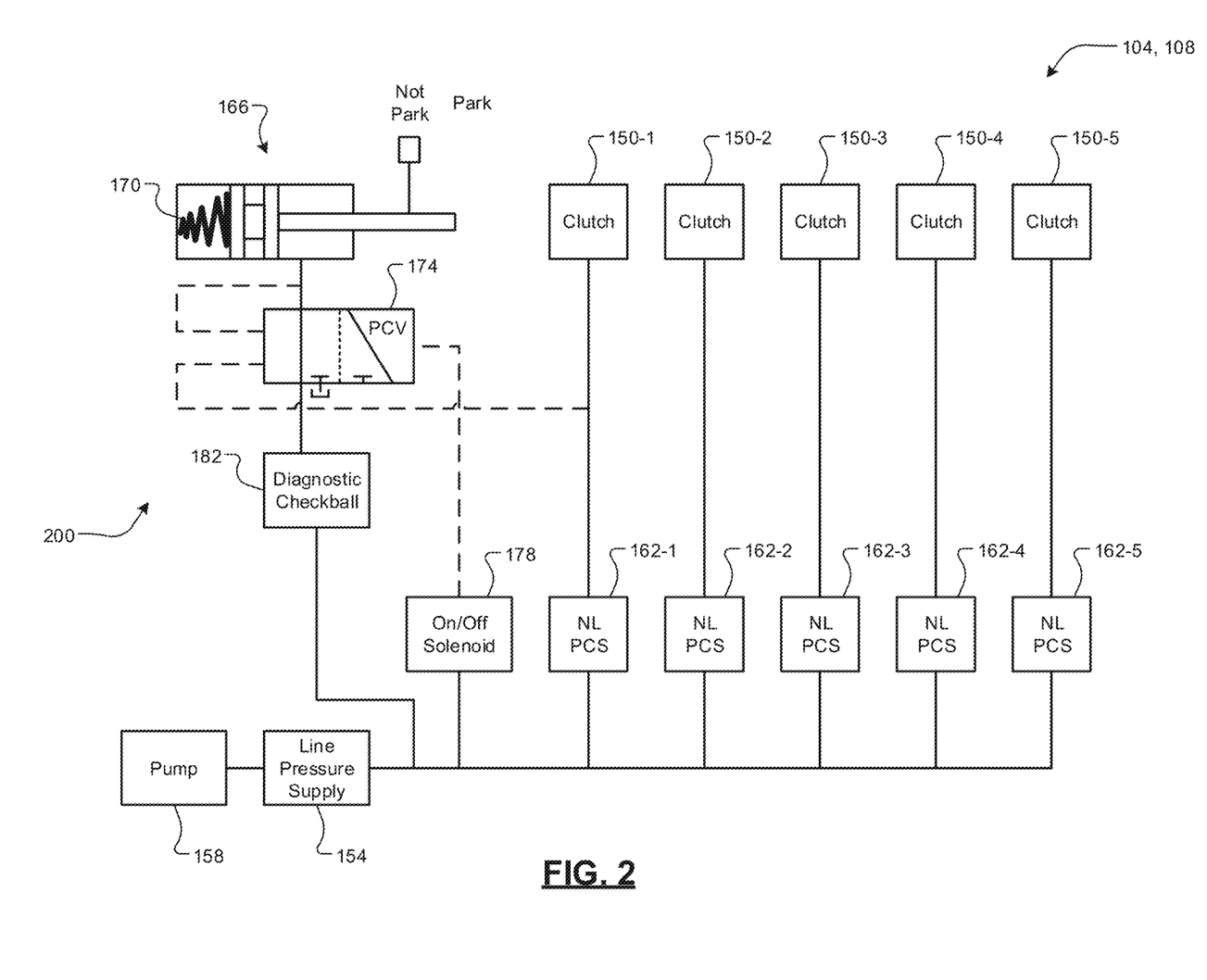
FIG. 2 depicts an electro-hydraulic park control system including a park control valve for a hydraulically-actuated automatic transmission of a vehicle according to the principles of the present application.

Referring specifically now to FIG. 2, the transmission 104 comprises five clutch or band elements 150-1 . . . 150-5 (collectively, "clutches 150") and a line pressure supply 154 provided by an engine/motor driven pump 158 of the transmission 104. It will be appreciated, however, that the transmission 104 could comprise other quantities of elements. Each element 150 is actuated by a corresponding normally low (NL) pressure control solenoid (PCS) 162-1 . . . 162-5 (collectively, "NL PCS's 162"). A park piston 166 is actuated to a not park position ("Not Park;" also referred to herein as an "out of park position") by hydraulic pressure, and is returned to a park position ("Park") by a spring 170 when hydraulic pressure is exhausted. As discussed above, in order to achieve the above-described goals, the electro-hydraulic park control system 200 must provide the following functionality: (1) when the transmission 104 is in reverse, neutral, or drive, hydraulic pressure is fed to the park piston 166 to move it out of the park position, (2) when the transmission 104 is in park, hydraulic pressure is exhausted from the park piston 166 so the park piston return spring 170 moves it to the park position, and (3) when the transmission hydraulic line pressure supply 154 is not provided (i.e., when the engine/motor driven pump 158 is off or not running), the park piston defaults to the park position.

Figure 3:
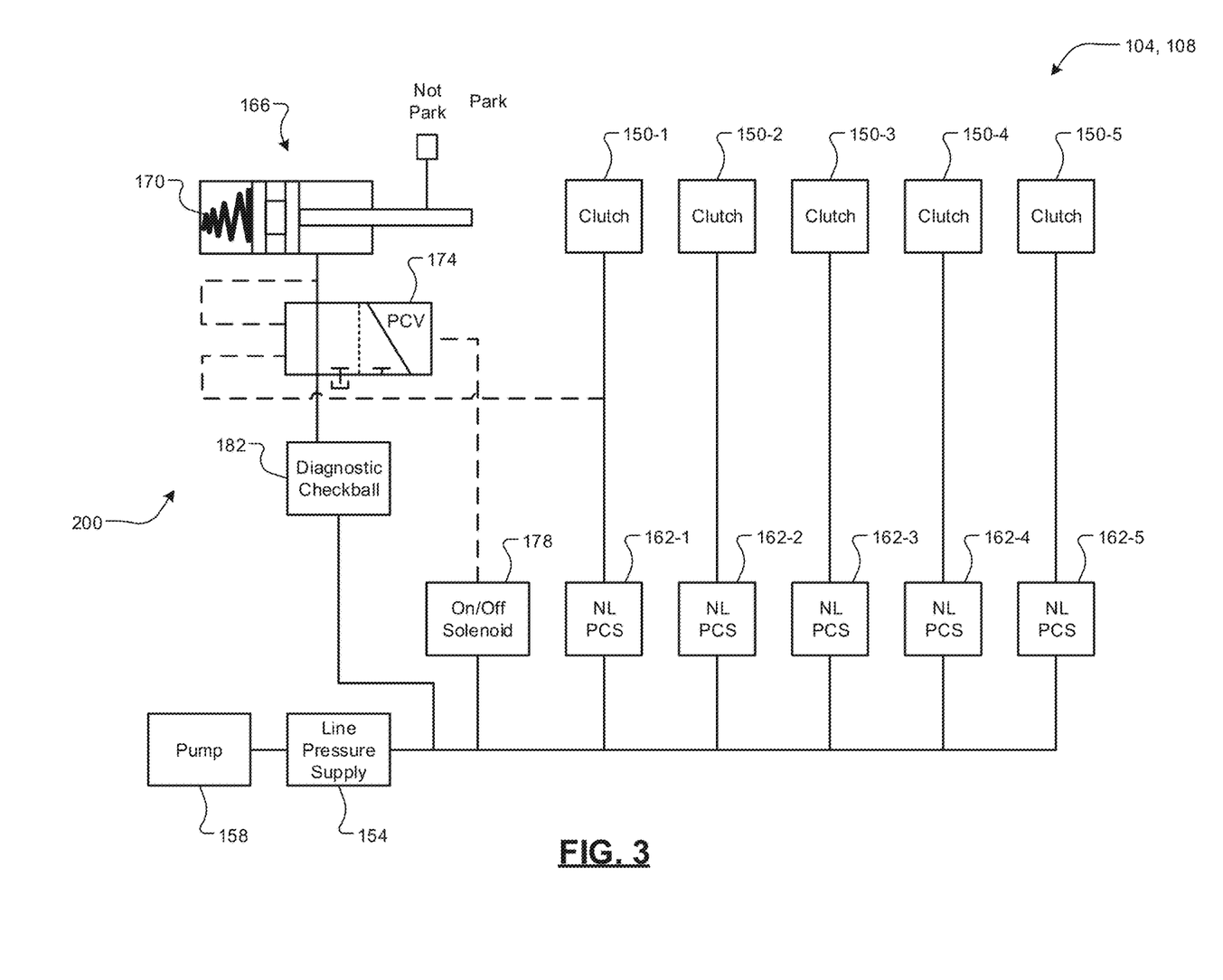
FIG. 3 depicts the electro-hydraulic park control system of FIG. 2 during drive, neutral, and reverse operation of the transmission according to the principles of the present application.

The electro-hydraulic park control system 200 of the present application as shown in FIG. 2 further comprises a park control valve ("PCV") 174 and an on/off solenoid 178. In some implementations, the electro-hydraulic park control system 200 of the present application further comprises a park valve diagnostic checkball 182 to be utilized in diagnosing a stuck park control valve 174. The operation of the electro-hydraulic park control system 200 of FIG. 2 during various states of the transmission 104 will now be described in greater detail. FIG. 3 illustrates the electro-hydraulic park system 200 of FIG. 2 during drive, reverse, or neutral operation of the transmission 104. During normal operation (i.e., not during a malfunction of the controller 120), the on/off solenoid 178 is in an off state and the hydraulic pressure of clutch 150-1 is elevated when the transmission 104 is shifted from park to any out of park states (drive/neutral/reverse), which moves the park control valve 174 to the out of park position. Once the park control valve 174 is at the out of park position, hydraulic pressure is fed to the park piston 166 through the park control valve 174 and hydraulic pressure is also routed through the valve 174 to keep it at the out of park position even without clutch 150-1 hydraulic pressure. During default operation when the controller 124 is malfunctioning (e.g., due to an internal fault or an electrical power loss), the following operation happens. Hydraulic pressure supply is still present, due to the engine/motor driven pump 158 still being on or running, and all clutches 150 are all open. Hydraulic pressure still keeps the park control valve 174 at the out of park position, and hydraulic pressure still feeds to the park piston 166 to keep it at the out of park position, and the transmission 104 defaults to the neutral state.

Figure 4:
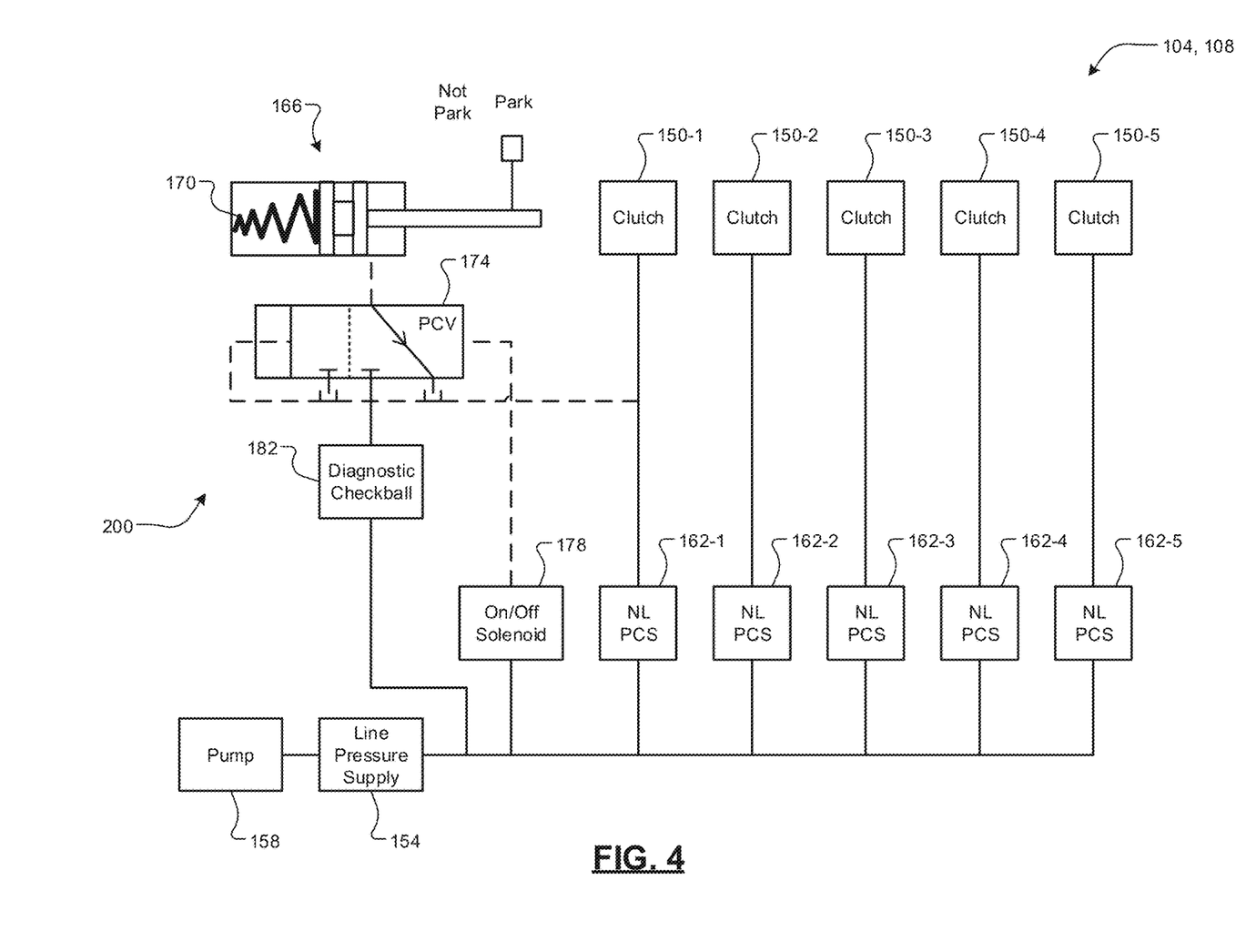
FIG. 4 depicts the electro-hydraulic park control system of FIG. 2 during park operation of the transmission according to the principles of the present application.

FIG. 4 illustrates the electro-hydraulic park system 200 of FIG. 2 during park operation of the transmission 104. During normal operation (i.e., not during a malfunction of the controller 120), the on/off solenoid 178 is turned on to push the park control valve 174 to the left (park) position, during a shift from any out of park position (drive/neutral/reverse) to the park position. The on/off solenoid 178 is then able to be turned off after this shift, as the park control valve 174 is kept at the park position by its valve return spring. Hydraulic pressure at the park piston 166 is exhausted through the vent port on the park control valve 174, and the transmission 104 is in the park state. During default operation when the controller 120 is malfunctioning (e.g., due to an internal fault or an electrical power loss), the following operation happens. the on/off solenoid 178 defaults to the off position, the park control valve 174 stays at the park position, and the transmission 104 remains in the park state.

Figure 5:
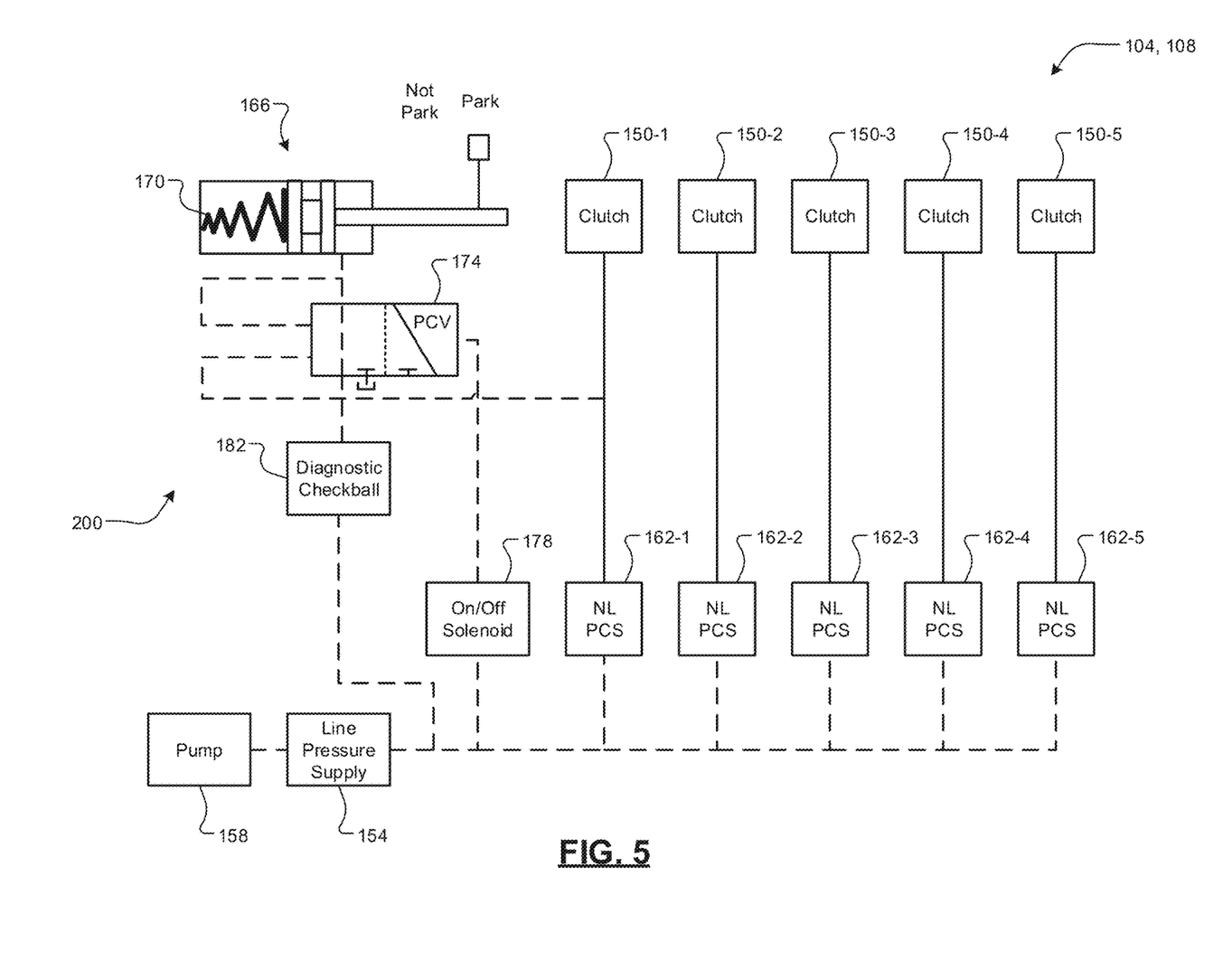
FIG. 5 depicts a stuck park control valve diagnostic feature for the electro-hydraulic park control system of FIG. 2 during park operation of the transmission according to the principles of the present application.

FIG. 5 illustrates a stuck park control diagnostic feature of the electro-hydraulic park system 200 of FIG. 2 during operation of the transmission 104. If the park control valve 174 is stuck at the out of park position after any shift from any out of park position (drive/neutral/reverse) to the park position, the park piston 166 is still able to move to the park position when the engine/motor driven pump 158 is turned off. However, when the engine/motor driven pump 158 restarts, the park piston 166 could be unintentionally moved to the out of park position without a command to shift out of park. In order to detect this situation and avoid or prevent the unintentional movement to the out of park position, the park valve diagnostic checkball 182 is implemented in the feed circuit of the park control valve 174 to add flow restriction in such a scenario. The park piston 166 is exhausted through the vent path that is parallel to the diagnostic checkball 182. The orifice in this vent path is very restrictive such that the time duration for the park piston 166 to move from the out of park position to the park position is much longer (e.g., abnormally long) compared to when the park control valve 174 is not stuck. A park piston position sensor (not shown) could also be implemented to detect this abnormally long park piston stroke time and, in this situation, the driver of the vehicle 100 could be alerted to the risk of an unintended out of park transition and/or vehicle functionality (e.g., remote start) could be disabled.

Figure 6:
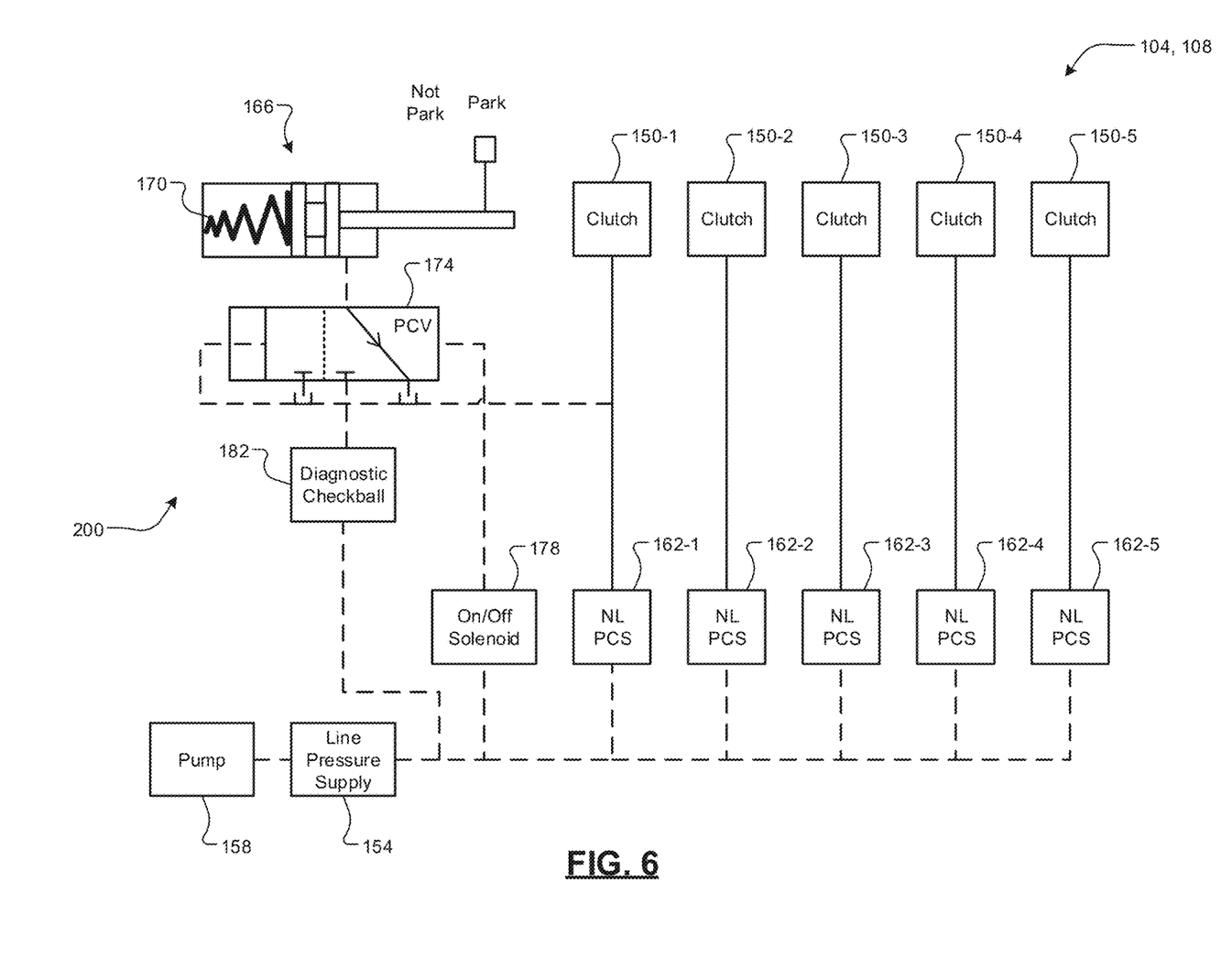
FIG. 6 depicts the electro-hydraulic park control system of FIG. 2 during operation of the transmission when an engine/motor driven pump of the transmission is off according to the principles of the present application.

Lastly, FIG. 6 illustrates the electro-hydraulic park system 200 of FIG. 2 during operation of the transmission 104 when the engine/motor driven pump 158 of the transmission 104 is off or not running. During normal operation, hydraulic pressure is lost because the engine/motor driven pump 158 is off, so all clutch hydraulic pressures are exhausted and the park piston 166 hydraulic pressure is also exhausted, and the transmission 104 goes to the park state, regardless of the previous state that the transmission 104 was at. The default operation during this operation of the transmission 104 is also the same as the normal operation.

Figure 7:
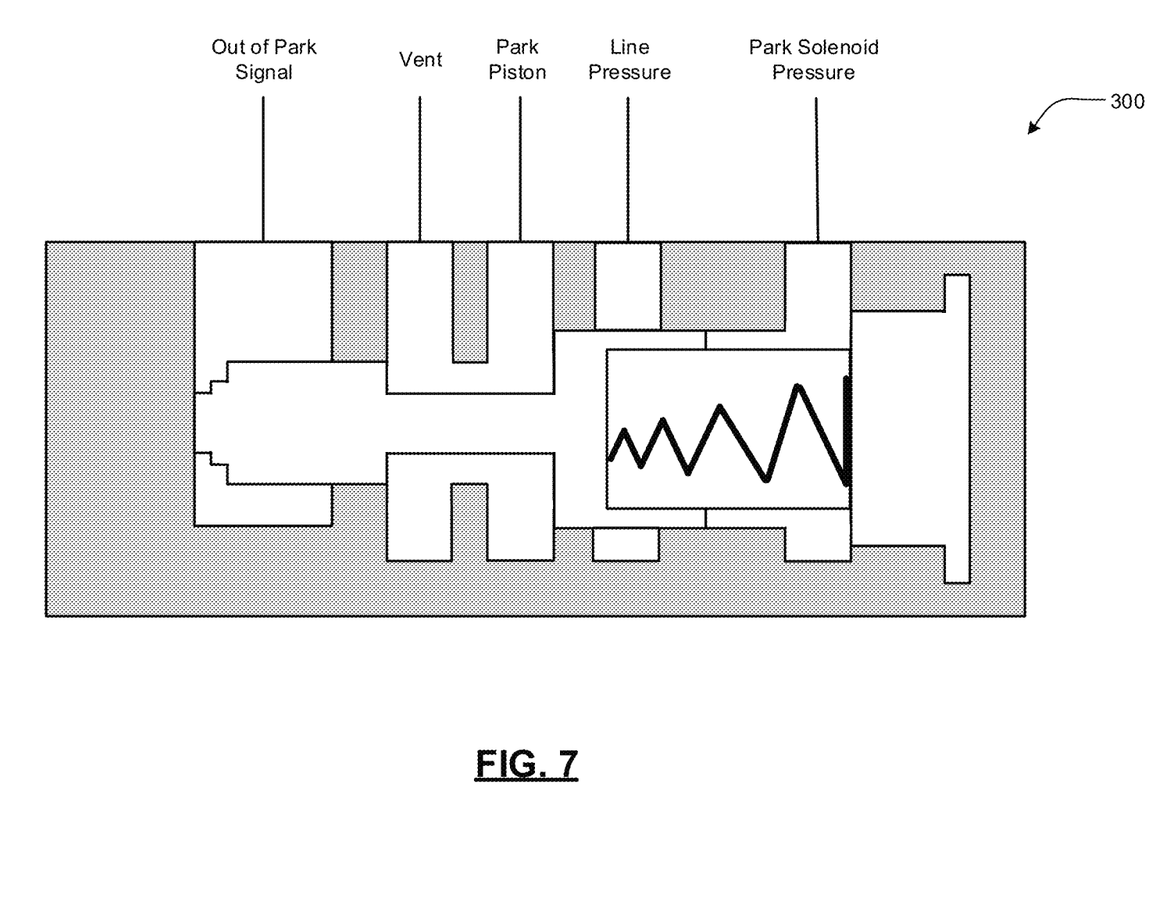
FIG. 7 depicts operation of one example configuration of the park control valve at the installed position according to the principles of the present application.
Figure 8:
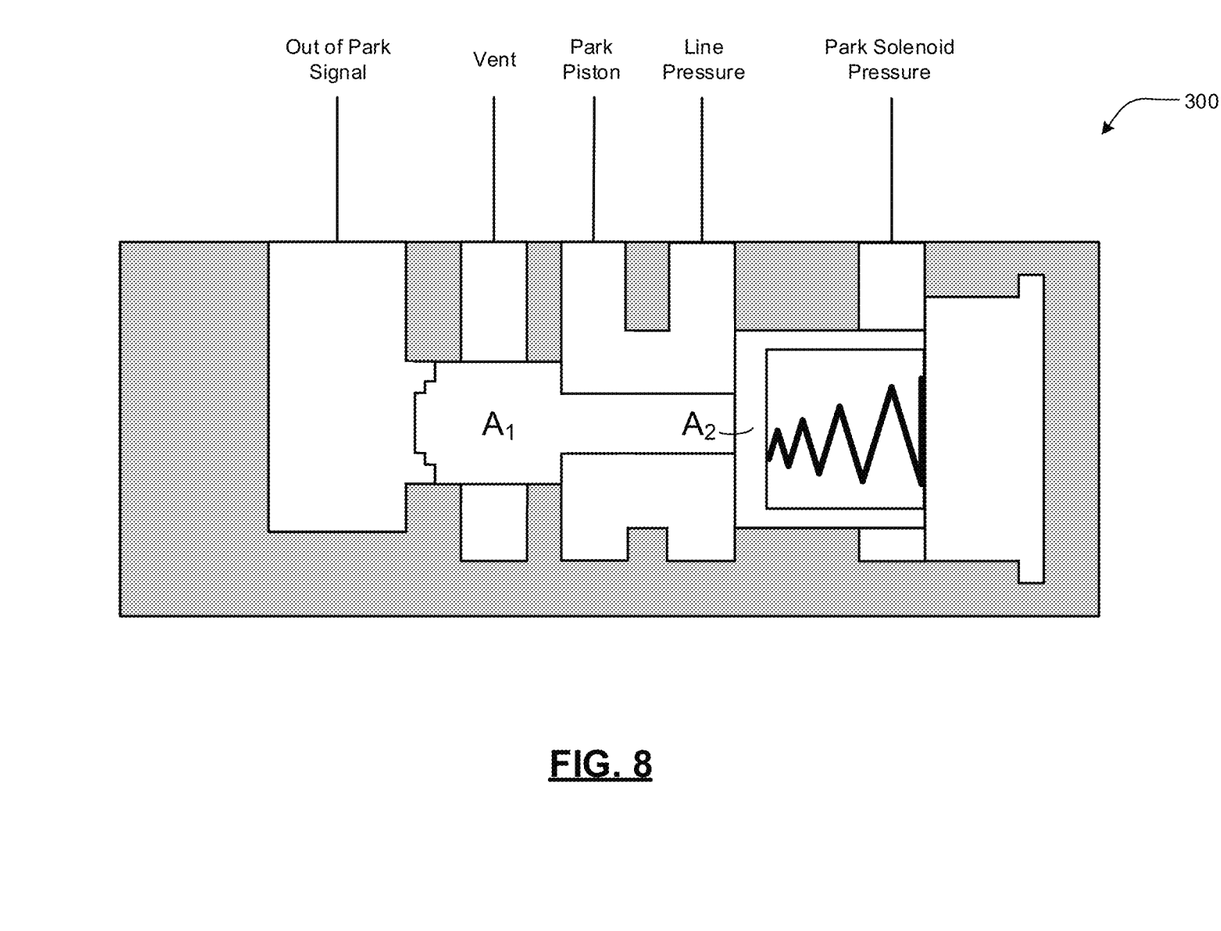
FIG. 8 depicts operation of the park control valve of FIG. 7 at the stroked position according to the principles of the present application.
Figure 9:
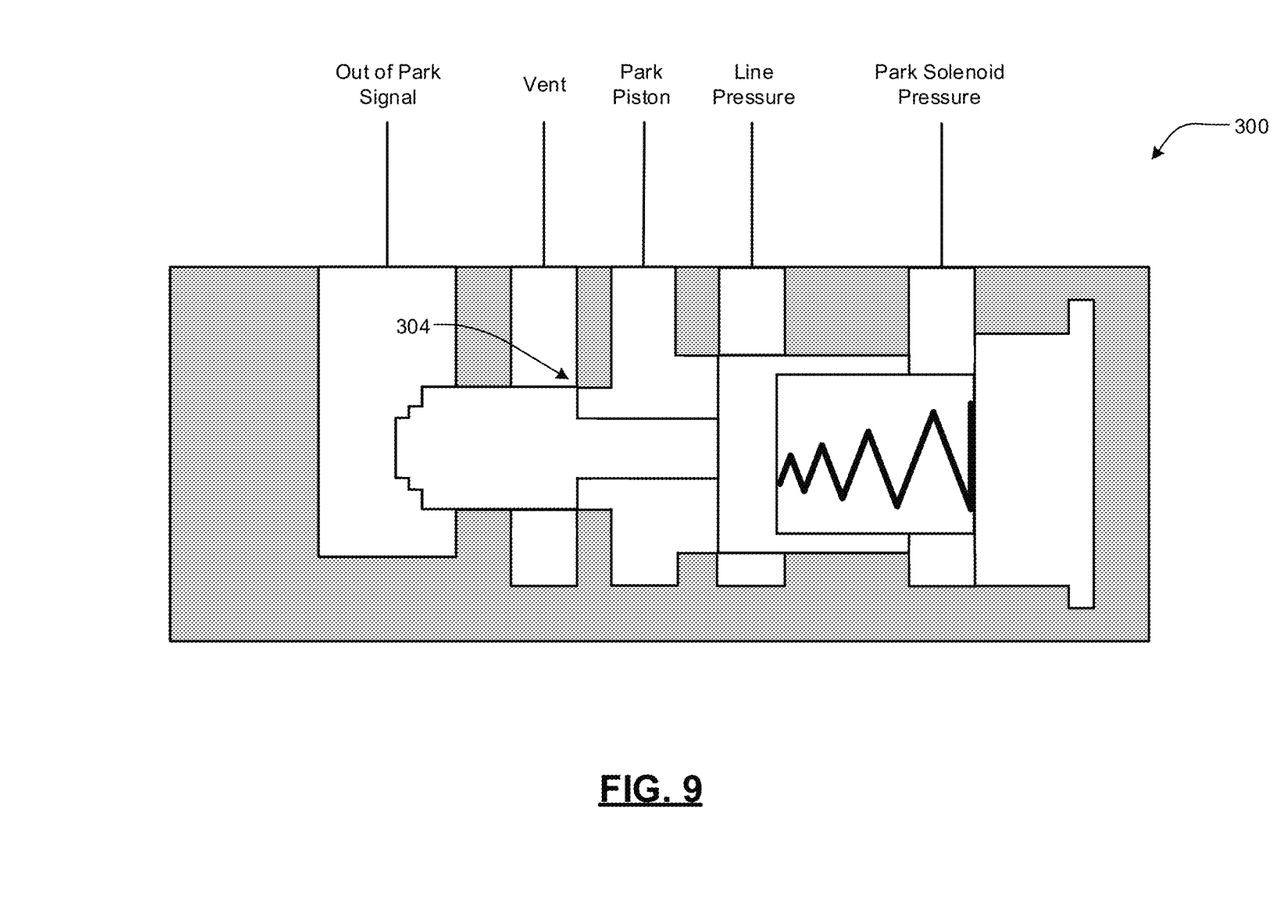
FIG. 9 depicts operation of the park control valve of FIGS. 7-8 at the intermediate position according to the principles of the present application.

In one exemplary implementation, the park control valve 174 is a hydraulic spool valve that controls the hydraulic pressure fed to the park actuation piston 166 with the following functionality and as also depicted in greater detail in FIGS. 7-9. At the installed (default or non-actuated) position, hydraulic pressure is exhausted from the park piston 166 to vent so the park piston return spring 170 moves it to the park position. At the stroked (fully actuated) position, hydraulic pressure is fed to the park piston 166 to move it to the out of park (not park) position, and the park control valve 174 latches itself to this stroked position. At any intermediate (partially actuated) position therebetween, the park piston 166 is connected either to the hydraulic pressure feed port or the vent port in order to prevent the park control valve 174 from being hydraulically locked in an intermediate position. These specific operational states of the park control valve 174 will now be described in greater detail with reference to more detailed illustrations of the configuration of the park control valve 174.

FIG. 7 illustrates the operation of one example configuration 300 of the park control valve 174 (hereinafter, "park control valve 300") at the installed position. This valve configuration is designed so as to occupy minimal packaging space in the transmission valve body 108. During normal operation (i.e., not during a malfunction of the controller 120), the on/off solenoid 178 is turned on, which provides hydraulic pressure to a spring pocket of the park control valve 300. The on/off solenoid 178 hydraulic pressure acting on the park control valve 300, in addition to the spring force of the park control valve 300, moves the park control valve 174 to the illustrated installed position. At this installed position, the park piston port is connected to the vent port, which provides an exhaust path to the hydraulic pressure in the park piston 166. The park piston 166 thereby moves to the park position as a result. Once the out of park signal hydraulic pressure, which could be from a solenoid or a clutch, is off, the park control valve 300 is able to remain at the installed position without on/off solenoid hydraulic pressure. During default operation when the controller 120 is malfunctioning (e.g., due to an internal fault or an electrical power loss), the following operation happens. If the park control valve 300 is already at the installed position, the park control valve 300 remains at the installed position, thereby keeping the park piston 166 at park. If the park control valve 300 is at a stroked position, the park control valve 300 will remain at the stroked position until hydraulic line pressure falls to zero, whereby the park control valve 300 will then move to the installed position and thereby cause the park piston 166 to move to park.

FIG. 8 illustrates operation of the park control valve 300 at the (fully) stroked position. During normal operation (i.e., not during a malfunction of the controller 120), the out of park signal hydraulic pressure is turned on when the transmission 104 shifts out of park, while the on/off solenoid 178 remains off, which strokes the park control valve 300 against the valve spring force. At this stroked position, the park piston port is connected to the line pressure port, which feeds hydraulic pressure to the park piston 166 and causes it to move to the out of park (not park) position as a result. Once the park control valve 300 reaches the stroked position, the line pressure acts on park control valve areas A1 and A2. Because A2 is larger than A1, the net force pushes the valve against the valve spring, which latches the valve 300 at the stroked position, even in the absence of out of park signal hydraulic pressure. When the transmission 104 shifts from out of park to park, the force applied by the on/off solenoid 178 hydraulic pressure in addition to the valve spring force overcomes the latch force applied by the line pressure, which causes the valve 300 to move to the installed position. During default operation when the controller 120 is malfunctioning (e.g., due to an internal fault or an electrical power loss), the following operation happens. If line pressure is present, it latches the valve 300 at the stroked position, thereby continuing to feed hydraulic line pressure to the park piston 166 to keep it out of park. If line pressure is lost, however, the valve 300 moves to the installed position, which causes the park position to move to park.

Lastly, FIG. 9 illustrates operation of the park control valve 300 at the intermediate (partially stroked) position. During normal operation (i.e., not during a malfunction of the controller 120), the valve 300 is able to pass through the intermediate position. However, a hydraulic lock situation could occur on the park control valve 300 if it follows normal practice of having an intermediate position where the park piston port is neither connected to the line pressure port nor the vent port. One specific sequence of events that could lead to this hydraulic lock situation, hereinafter described as steps (1)-(6), are as follows. Initially at (1) the controller 120 is malfunctioning when the valve 300 is at the stroked position, so the valve 300 is latched to the stroked position, (2) the transmission hydraulic fluid (e.g., oil) pump 158 is shut off, (3) line pressure is in the process of dropping or falling to zero, so the valve 300 starts to move to the installed position, and (4) when the valve 300 is at the intermediate position where the park piston port is neither connected to the line pressure port nor the vent port, the park piston pressure is isolated from both the line pressure port and the vent port except for valve leakage.

Still during (4), at this position, the trapped park piston pressure is enough to balance the valve spring force, so the valve 300 reaches a balanced state and stays at the intermediate position, until the park piston pressure drops below the balance level as valve leakage reduces the park piston pressure. Next, at (5) the valve 300 resumes moving to the installed position, after the valve 300 is hydraulically locked in the intermediate position for some time and finally at (6) as a result, the transmission 104 experiences a delay between the hydraulic fluid pump 158 shutoff and the transmission 104 actually reaching the park state. This delay could be of sufficient duration to result in unintentional vehicle movement when the transmission 104 goes to the default mode and the driver intends to secure the vehicle 100 by shutting off the torque generating system 112 or other drive motor. In order to prevent this delay, a notch feature 304 is provided on the valve port that will connect the park piston 166 to the vent port when the line pressure is blocked from the park piston port. With this notch feature 304, there is not an intermediate state where the park piston port is neither connected to the line pressure port nor the vent port. Thus, this temporary hydraulic lock at the intermediate position is avoided, and the transmission delay described above is also avoided.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described.

What is claimed is:

1. An electro-hydraulic park control system for a transmission of a vehicle, the system comprising:
   a park piston configured to transition between park and non-park positions to control the transmission to park and non-park states, respectively; and
   a park control valve disposed in a valve body of the transmission and configured to transition between park and non-park positions to control a supply of a hydraulic fluid pressure to control the park piston and to operate such that:
   (i) no single element failure of the transmission will cause the transmission to shift from the park state to the non-park state,
   (ii) no single element failure of the transmission will cause the transmission to shift from a drive, reverse, or neutral state to the park state when there is the hydraulic fluid pressure to the park piston,
   (iii) the transmission is configured to remain in the non-park state and remain in or transition to the neutral state when a controller of the transmission is malfunctioning while the transmission is operating in the drive, reverse, and neutral states, and
   (iv) the transmission is configured to transition to the park state in less than a period that could result in unintentional vehicle movement while an engine/motor driven pump of the transmission is off or not running, regardless of whether the controller is malfunctioning or not.

2. The system of claim 1, wherein the valve body of the transmission further comprises an on/off solenoid configured to supply hydraulic fluid pressure to control the park control valve.

3. The system of claim 1, wherein during the drive, reverse, and neutral states of the transmission:
   during normal operation when the controller is not malfunctioning, the on/off solenoid is in an off state and hydraulic fluid pressure is fed to the park piston through the park control valve to keep it in the non-park position; and
   during default operation when the controller is malfunctioning, hydraulic pressure is maintained by the pump and fed to the park piston through the park control valve to keep it in the non-park state and the transmission defaults to the neutral state.

4. The system of claim 1, wherein during the park state of the transmission:
   during normal operation when the controller is not malfunctioning, the on/off solenoid is turned to an on state to feed hydraulic fluid pressure to the park control valve to transition it to the park state during a non-park to park transmission shift and the on/off solenoid is turned back to the off state thereafter and hydraulic pressure at the park piston is exhausted through a vent port of the park control valve to keep it at the park position; and
   during default operation when the controller is malfunctioning, the on/off solenoid defaults to the off position, the park control valve and the park piston remain at the park positions, and the transmission remains in the park state.

5. The system of claim 1, further comprising a diagnostic checkball valve connected between the park control valve and a line pressure supply line connected to the pump.

6. The system of claim 5, wherein the diagnostic checkball valve comprises a restricted parallel vent path configured to restricted exhaustion of hydraulic pressure in the park piston.

7. The system of claim 6, wherein the restricted exhaustion of the hydraulic fluid pressure in the park piston provides an opportunity for the park control valve to transition from being stuck in the non-park position after the pump is turned off such that the park piston is still able to move to the park position.

8. The system of claim 1, wherein when the pump is off or not running and during normal operation when the controller is not malfunctioning, hydraulic pressure is lost at the park piston and the park control valve causing the transmission to transition to the park state regardless of its previous state.

9. The system of claim 1, wherein the park control valve is a hydraulic spool valve that controls hydraulic fluid pressure fed to the park piston via three different states including an installed/default state, a fully-actuated/stroked state, and an intermediate/partially actuated state.

10. A valve body of a transmission of a vehicle, the transmission comprising a park piston configured to transition between park and non-park positions to control the transmission to park and non-park states, respectively, the valve body comprising:
    a park control valve configured to transition between park and non-park positions to control a supply of hydraulic fluid pressure to control the park piston; and
    an on/off solenoid configured to supply a hydraulic fluid pressure to control the park control valve,
    wherein the park control valve is configured to operate such that:
    (i) no single element failure of the transmission will cause the transmission to shift from the park state to the non-park state,
    (ii) no single element failure of the transmission will cause the transmission to shift from a drive, reverse, or neutral state to the park state when there is the hydraulic fluid pressure to the park piston,
    (iii) the transmission is configured to remain in the non-park state and remain in or transition to the neutral state when a controller of the transmission is malfunctioning while the transmission is operating in the drive, reverse, and neutral states, and
    (iv) the transmission is configured to transition to the park state in less than a period that could result in unintentional vehicle movement while an engine/motor driven pump of the transmission is off or not running, regardless of whether the controller is malfunctioning or not.

11. The valve body of claim 10, wherein during the drive, reverse, and neutral states of the transmission:
    during normal operation when the controller is not malfunctioning, the on/off solenoid is in an off state and hydraulic fluid pressure is fed to the park piston through the park control valve to keep it in the non-park position; and
    during default operation when the controller is malfunctioning, hydraulic pressure is maintained by the pump and fed to the park piston through the park control valve to keep it in the non-park state and the transmission defaults to the neutral state.

12. The valve body of claim 10, wherein during the park state of the transmission:
    during normal operation when the controller is not malfunctioning, the on/off solenoid is turned to an on state to feed hydraulic fluid pressure to the park control valve to transition it to the park state during a non-park to park transmission shift and the on/off solenoid is turned back to the off state thereafter and hydraulic pressure at the park piston is exhausted through a vent port of the park control valve to keep it at the park position; and during default operation when the controller is malfunctioning, the on/off solenoid defaults to the off position, the park control valve and the park piston remain at the park positions, and the transmission remains in the park state.

13. The valve body of claim 10, further comprising a diagnostic checkball valve connected between the park control valve and a line pressure supply line connected to the pump.

14. The valve body of claim 13, wherein the diagnostic checkball valve comprises a restricted parallel vent path configured to restricted exhaustion of hydraulic pressure in the park piston.

15. The valve body of claim 14, wherein the restricted exhaustion of the hydraulic fluid pressure in the park piston provides an opportunity for the park control valve to transition from being stuck in the non-park position after the pump is turned off such that the park piston is still able to move to the park position.

16. The valve body of claim 10, wherein when the pump is off or not running and during normal operation when the controller is not malfunctioning, hydraulic pressure is lost at the park piston and the park control valve causing the transmission to transition to the park state regardless of its previous state.

17. The valve body of claim 10, wherein the park control valve is a hydraulic spool valve that controls hydraulic fluid pressure fed to the park piston via three different states including an installed/default state, a fully-actuated/stroked state, and an intermediate/partially actuated state.

* * * * *